(12) United States Patent
Soshin (10) Patent No.: US 9,111,390 B2
(45) Date of Patent: Aug. 18, 2015

(54) VISUALLY REPRESENTING ENTITY RELATIONSHIPS

(75) Inventor: Alexey Soshin, Ramat Gan (IL)

(73) Assignee: SAP Portals Israel Ltd, Ra'anana (IL)

( * ) Notice: Subject to any disclaimer, the term of this patent is extended or adjusted under 35 U.S.C. 154(b) by 151 days.

(21) Appl. No.: 13/549,996

(22) Filed: Jul. 16, 2012

(65) Prior Publication Data

US 2014/0015837 A1 Jan. 16, 2014

(51) Int. Cl.
*G06T 11/20* (2006.01)

(52) U.S. Cl.
CPC ..................... *G06T 11/206* (2013.01)

(58) Field of Classification Search
CPC ........................ G06Q 10/10; G06F 17/30958
USPC .......................................................... 345/440
See application file for complete search history.

(56) References Cited

U.S. PATENT DOCUMENTS

| 7,606,168 | B2 * | 10/2009 | Robinson et al. | 370/254 |
| 2009/0254557 | A1 * | 10/2009 | Jordan | 707/9 |
| 2014/0082024 | A1 * | 3/2014 | Cao et al. | 707/802 |

OTHER PUBLICATIONS

GraphStream "GrapStream CSS Refence", webarchive from Jun. 9, 2011, http://web.archive.org/web/20110609022532/http://graphstream-project.org/doc/Tutorials/GraphStream-CSS-Reference_1.0/#styling-nodes-and-sprites.*

'Apache flex' [online]. Wikipedia, 2011, [retrieved on Jan. 13, 2014]. Retrieved from the Internet: <URL: http://en.wikipedia.org/w/index.php?title=Apache_Flex&oldid=438028001>, 6 pages.
'Facebook' [online]. Wikipedia, 2011, [retrieved on Jan. 13, 2014]. Retrieved from the Internet: <URL: http://en.wikipedia.org/w/index.php?title=Facebook&oldid=438124505>, 17 pages.
'Google+' [online]. Wikipedia, 2011, [retrieved on Jan. 13, 2014]. Retrieved from the Internet: <URL: http://en.wikipedia.org/w/index.php?title=Google%2B&oldid=438732819>, 3 pages.
'HCM Processes & Forms: User Exits, Dynamic Actions & Change Pointers' [online]. SAP, 2009, [retrieved on Jan. 13, 2014]. Retrieved from the Internet: <URL: http://scn.sap.com/community/erp/hcm/blog/2009/06/24/hcm-processes-forms-user-exits-dynamic-actions-change-pointersplease-check-your-expectations-at-the-door>, 4 pages.
'HTML5' [online]. Wikpedia, 2011, [retrieved on Jan. 13, 2014]. Retrieved from the Internet: <URL: http://en.wikipedia.org/w/index.php?title=HTML5&oldid=437882720>, 8 pages.

(Continued)

*Primary Examiner* — David Zarka
*Assistant Examiner* — Shivang Patel
(74) *Attorney, Agent, or Firm* — Fish & Richardson P.C.

(57) ABSTRACT

A computer-implemented method for generating a visual representation of entity relationships includes: receiving interaction information for relationships that a first entity has with regard to each of a plurality of second entities; determining, using the received interaction information and for each of the relationships, a first measure indicating a recentness of the relationship and a second measure indicating a balance of the relationship between the first and second entities; and presenting, using one or more processors, visual representations of at least some of the relationships, the visual representations comprising connections having length and shape corresponding to the first and second measures, respectively.

20 Claims, 5 Drawing Sheets

(56) References Cited

OTHER PUBLICATIONS

'Six degrees of separation' [online]. Wikipedia, 2011 [retrieved on Jan. 13, 2014]. Retrieved from the Internet: <URL: http://en.wikipedia.org/w/index.php?title=Six_degrees_of_separation&oldid=435719468>, 10 pages.

'Social graph' [online]. Wikipedia, 2011, [retrieved on Jan. 13, 2014]. Retrieved from the Internet: <URL: http://en.wikipedia.org/w/index.php?title=Social_graph&oldid=439750182>, 3 pages.

'Social network analysis' [online]. Wikipedia, 2011, [retrieved on Jan. 13, 2014]. Retrieved from the Internet: <URL: http://en.wikipedia.org/w/index.php?title=Social_network_analysis&oldid=436406384>, 2 pages.

* cited by examiner

VISUALLY REPRESENTING ENTITY RELATIONSHIPS

BACKGROUND

Social networks occur in many different situations. For example, colleagues at a workplace can be said to form a social network in the way that they interact with each other, both in performing work duties and perhaps also in other contexts. Social networks are sometimes visualized as graphs. For example, a graph can have nodes for the members of the social network, and edges representing the connections between different members. Such visualizations are sometimes called social graphs.

SUMMARY

In a first aspect, a computer-implemented method for generating a visual representation of entity relationships includes: receiving interaction information for relationships that a first entity has with regard to each of a plurality of second entities; determining, using the received interaction information and for each of the relationships, a first measure indicating a recentness of the relationship and a second measure indicating a balance of the relationship between the first and second entities; and presenting, using one or more processors, visual representations of at least some of the relationships, the visual representations comprising connections having length and shape corresponding to the first and second measures, respectively.

In a second aspect, a computer program product is tangibly embodied in a computer-readable storage medium and includes instructions that when executed by a processor perform a method for generating a visual representation of entity relationships. The method includes: receiving interaction information for relationships that a first entity has with regard to each of a plurality of second entities; determining, using the received interaction information and for each of the relationships, a first measure indicating a recentness of the relationship and a second measure indicating a balance of the relationship between the first and second entities; and presenting, using one or more processors, visual representations of at least some of the relationships, the visual representations comprising connections having length and shape corresponding to the first and second measures, respectively.

In a third aspect, a system includes: one or more processors and a computer program product comprising instructions that when executed cause a method for generating a visual representation of entity relationships to be performed. The method includes: receiving interaction information for relationships that a first entity has with regard to each of a plurality of second entities; determining, using the received interaction information and for each of the relationships, a first measure indicating a recentness of the relationship and a second measure indicating a balance of the relationship between the first and second entities; and presenting, using one or more processors, visual representations of at least some of the relationships, the visual representations comprising connections having length and shape corresponding to the first and second measures, respectively.

Implementations can include any or all of the following features. The first and second entities are first and second individuals and the interaction information reflects communications, wherein the first measure reflects when a most recent one of the communications occurred, and wherein the second measure reflects who of the first and second individuals initiated the communications. The first and second entities are first and second companies and the interaction information reflects purchases of goods or services, wherein the first measure reflects when a most recent one of the purchases occurred, and wherein the second measure reflects who of the first and second companies made the purchases. The second measure comprises first and second numbers for the first and second entities, respectively, and wherein an end of the connection toward the first entity has a width reflecting the first number and another end of the connection toward the second entity has a width reflecting the second number. The received information reflects interactions, and the method further includes identifying a date of an earliest interaction and a date of a most recent interaction, wherein the connection corresponds to a time axis from the date of the earliest interaction to a current date, and wherein the shape comprises a narrowing of the connection at the date of the most recent interaction. The method further includes presenting at least some of the received interaction information for one or more of the connections. The method further includes presenting a user interface for a user to control what is included in the interaction information.

Implementations can provide any or all of the following advantages. Social graphs can be visualized in a way that is more intuitive, more flexible and easier to read. Entity relationships can be visualized in a way that immediately indicates the balances of the respective relationships. Connections in a relationship graph can be formatted to indicate the proportions between the relationship and the current time or date.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for visualizing relationships. A relationship between two entities can be represented as a connection from one entity to the other, and the connection can have a length and shape that reflect some characteristic of the relationship. For example, a longer connection can indicate a more distant relationship, and the width of the connection can reflect a balance of the relationship between the two entities.

Figure 1:
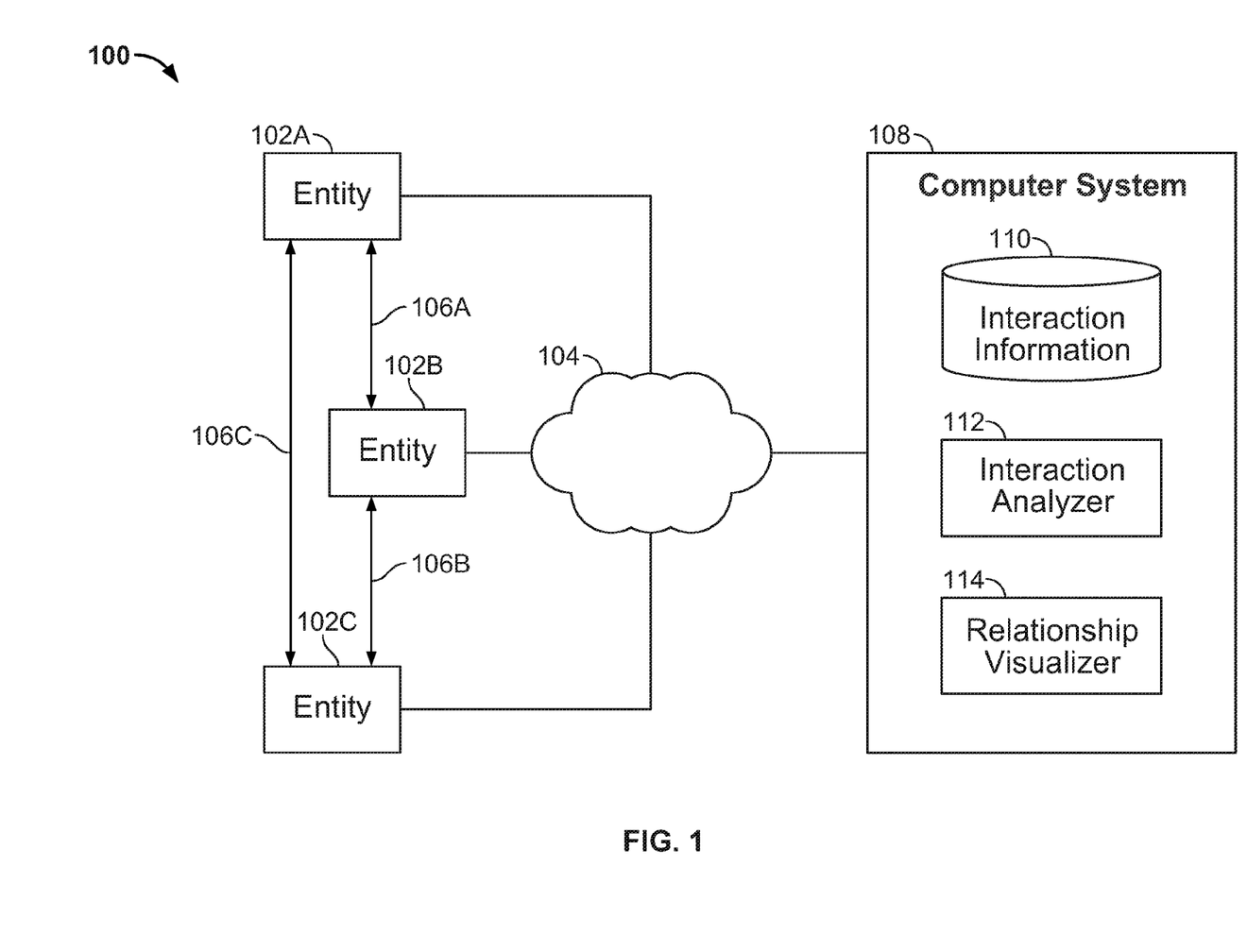
FIG. 1 shows an example of a system that can analyze relationships between entities.

FIG. 1 shows an example of a system 100 that can analyze relationships between entities. The system is here shown with three representative entities 102A-C. In some implementations, some or all of the entities 102A-C can be a device or other system (e.g., a mobile device or an email client) used by an individual. In some implementations, some or all of the entities 102A-C can correspond to a legal entity, including, but not limited to, a company or other organization.

The system 100 shows that the entities 102A-C are connected to any kind of network 104, such as a local area network or the internet. This can allow one or more of the entities 102A-C to communicate with each other and/or with other systems or devices (not shown). Such communications, or other interactions, can lead to the development of relationships between the entities. System 100 here schematically shows a relationship 106A between the entities 102A and B, a relationship 106B between the entities 102B and C, and a relationship 106C between the entities 102A and C. Other configurations of relationships can occur.

In implementations where two or more of the entities 102A-C are individuals, at least one of the relationships 106A-C can reflect a professional or social connection between people. The entities 102A-C may be colleagues, co-workers, friends or acquaintances, to name a few examples.

In implementations where two or more of the entities 102A-C are legal entities, at least one of the relationships 106A-C can reflect a professional relationship or other business connection between companies. The entities 102A-C may be vendors, service providers, customers, clients, consultants or other businesses.

The relationships 106A-C can be analyzed in one or more ways, for example to inform some or all of the entities 102A-C about the nature of the relationships. In this example, the system 100 includes a computer system 108 connected to the network 104 that can be used for such purpose, among other things. Here, the computer system 108 includes interaction information 110 that pertains to two or more of the entities 102A-C. For example, the interaction information can reflect contacts between individuals (e.g., email correspondence), or business transactions (e.g., sales of goods or services). The interaction information 110 can be stored in any suitable format that allows the information to be accessed for analysis and presentation.

The computer system 108 can collect or receive the interaction information from some or all of the entities 102A-C. As another example, the computer system 108 can be operated by an entity (similar to the entities 102A-C) and can therefore have access to data about the interactions in which such entity engages.

In some implementations, the interaction information 110 includes an inbox for electronic messages. For example, such information can include the data shown in the following table:

| Inbox From | To | Date |
|---|---|---|
| Me | HR Manager | Jan. 01, 2012 |
| Me | My good friend | Feb. 01, 2012 |
| My good friend | Me | Feb. 02, 2012 |
| Me | Old colleague | Mar. 01, 2012 |
| Old colleague | Me | Mar. 02, 2012 |
| Me | Old colleague | Mar. 03, 2012 |
| Old colleague | Me | Mar. 04, 2012 |
| Me | Old colleague | Mar. 05, 2012 |
| Old colleague | Me | Mar. 06, 2012 |
| Me | Old colleague | Mar. 07, 2012 |
| Old colleague | Me | Mar. 08, 2012 |
| Person A | Me | Mar. 02, 2012 |
| My good friend | Me | Feb. 03, 2012 |
| Person A | Me | Mar. 04, 2012 |
| Person A | Me | Mar. 05, 2012 |
| Person A | Me | Mar. 06, 2012 |
| Person A | Me | Mar. 07, 2012 |
| Me | Person B | Mar. 08, 2012 |

-continued

| Inbox From | To | Date |
|---|---|---|
| Me | Person B | Mar. 09, 2012 |
| Me | Person B | Mar. 10, 2012 |
| Person A | Me | Mar. 11, 2012 |
| Person A | Me | Mar. 12, 2012 |
| Person A | Me | Mar. 13, 2012 |
| Me | Person B | Mar. 14, 2012 |
| Me | Person B | Mar. 15, 2012 |
| Me | My good friend | Apr. 01, 2012 |
| My good friend | Me | Apr. 02, 2012 |
| Me | New colleague | May 01, 2012 |
| New colleague | Me | Jun. 01, 2012 |
| Me | New colleague | Jun. 02, 2012 |
| My good friend | Me | Jun. 03, 2012 |
| Me | New colleague | Jun. 04, 2012 |

That is, the above table shows emails exchanged between a From party and a To party, and also the date of the correspondence. For example, on Mar. 2, 2012, Person A sent an email to the owner of the email account (labeled "Me"), and on Mar. 8, 2012, the account holder sent an email to Person B.

The computer system 108 includes an interaction analyzer 112 that can analyze the interaction information 110. For example, the interaction analyzer can parse records of electronic communication to determine the entities involved, what the communication was about, and the date(s) of the correspondence. As another example, the interaction analyzer can parse sales records to determine the parties involved, what the transaction involved, and the date(s) of the transaction. In some implementations, the interaction analyzer 112 is implemented on a client device operated by one of the entities and can perform its analysis on available information (e.g., the emails in an email client).

The results of analyzing relationships can be visualized in one or more ways. The computer system 108 here includes a relationship visualizer 114 that can present one or more visualizations in a graphical user interface (GUI). An example of a visualization will now be described.

Figure 2:
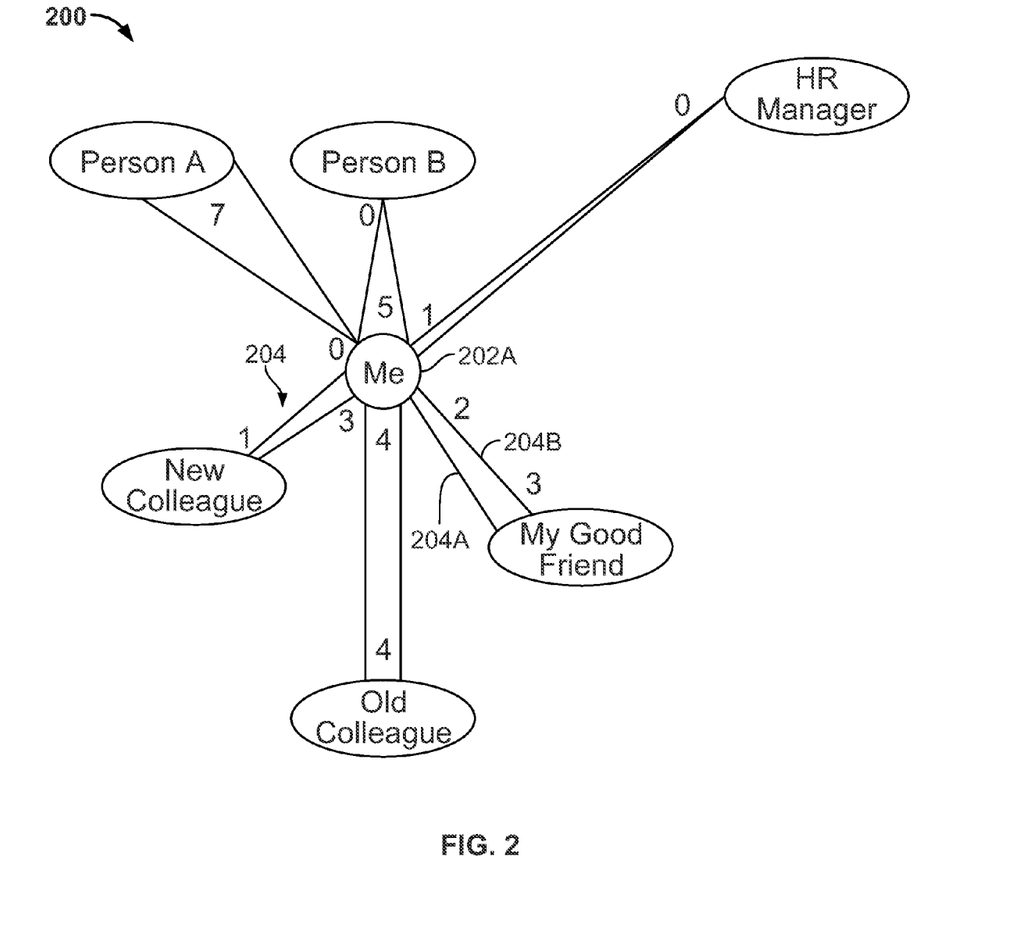
FIG. 2 shows an example of a visual representation of a social graph.

FIG. 2 shows an example of a visual representation 200 of a social graph. In some implementations, the interaction analyzer 112 (FIG. 1) can analyze the information about email correspondence shown in the above table, and the relationship visualizer 114 can then present the visual representation 200 in a GUI (e.g., for one of the entities 102A-C in FIG. 1.)

The visual representation 200 includes nodes 202 (e.g., a Me node 202A) that are labeled for the following entities: Me, Person A, Person B, HR Manager, My good friend, Old colleague and New colleague. Here, the visual representation focuses on the email account holder (e.g., "Me") and the Me node is therefore in the center.

The Me node 202 is connected to each of the other nodes by respective connections 204 that represent the relationship between the corresponding entities. Each connection is here labeled with two pieces of information: the number of times that the email account holder has sent a message to the other entity, and vice versa. For example, for the New colleague node the numbers are three and one, indicating that the email account holder has communicated three times with the new colleague, and the new colleague has communicated once with the account holder.

The connections 204 can be two-dimensional geometric shapes that connect the corresponding nodes to each other. Here, for example, each of the connections includes lines 204A and B connecting the two nodes. The slope of the lines 204A-B indicates the balance of the relationship between the entities. For example, with regard to the node called My good friend, the lines 204A-B are angled so that the end toward the My good friend node is wider than the end toward the account holder's node. This reflects the respective numbers (here, three and two) that characterize the relationship of these two entities. Each end can have a width that is proportional to the corresponding number. Here, because the entity "My good friend" has sent more emails to the account holder than vice versa, the connection is broader toward the friend's node.

The more one-sided the relationship, the more the connection will tend toward a triangle, in this example. Here, Person A has sent seven emails to the account holder without any response. The corresponding connection indicates this by having a relatively wide base toward Person A while narrowing to a point toward the account holder. This gives a quick visual overview of where the balance of the relationship lies. For example, the pointy connection (e.g., a triangle) can be said to indicate the flow of interaction between the entities (in this example, a flow in only one direction). Similarly, for Person B the situation is essentially the opposite, which is indicated by a triangle pointing away from the account holder instead.

The connections 204 can indicate when the relationship is essentially even between the two entities. For example, the numbers between the account holder and the node called Old colleague are here four and four, and the connection therefor is equally wide at both ends.

The visual representation 200 can also indicate how recent the relationship is. In this example, the email correspondence with the new colleague took place May 1-Jun. 4, 2012 (see table above), which is a relatively recent time. For example, the recentness analysis can take into account the date (and/or time) of the most recent communication.

The corresponding connection is therefore relatively short, to indicate that the relationship between the account holder and the new colleague is of recent date. On the contrary, the email communication from the account holder to the HR manager (one email) occurred some time ago on Jan. 1, 2012. The corresponding connection is therefore longer for the HR Manager node than for the New employee node.

In some implementations, the nodes can be distributed around the center node in an essentially random way, such that older and newer relationships are substantially mixed with each other. In other implementations, the entities can be organized according to one or more parameters. For example, the nodes can be sorted based on relationship recentness, relationship balance, and/or interaction volume. Filtering can be applied, for example such that too remote relationships are not visualized.

In short, to generate a visual representation of entity relationships, interaction information can be received and used for determining recentness and balance of various relationships between entities. Visual representations of at least some of the relationships can then be presented that have a length corresponding to the recentness measure and shape corresponding to the balance measure.

Social graphs are not limited by level. For example, if the email account holder has access to emails of the "My good friend" entity, the account holder can see more edges and nodes around that entity. In some such implementations, the user can see a connection between two or more other entities if that connection exists. For example, the account holder could see a connection between the "Old colleague" entity and the "My good friend" entity.

The analyzed relationships can involve matters other than social interactions. In some implementations, business transactions such as sales can be taken into account. For example, the entities can then include the company that provides a product or service, and one or more customers, such as other companies or individuals. The results of analyzing such interaction information can be visualized using a presentation analogous to the visual representation 200. For example, instead of sent and received emails, the connections 204 can then indicate the amounts of sales from the respective entities to each other. In some implementations, the shape of such a connection can reflect whether one of the two entities is purchasing more from the other entity. Also, the length of the connection can indicate the recentness of the transaction(s).

Figure 3A:
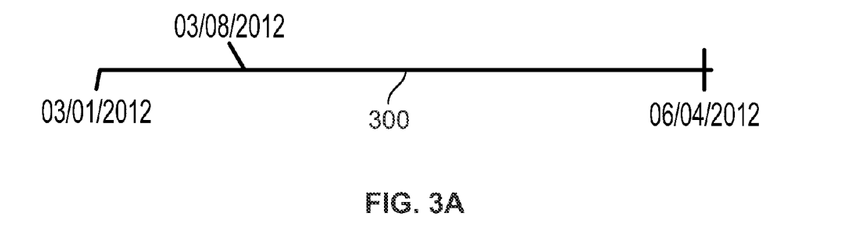
FIGS. 3A-C show an example of visualizing a recentness of a relationship.
Figure 3B:
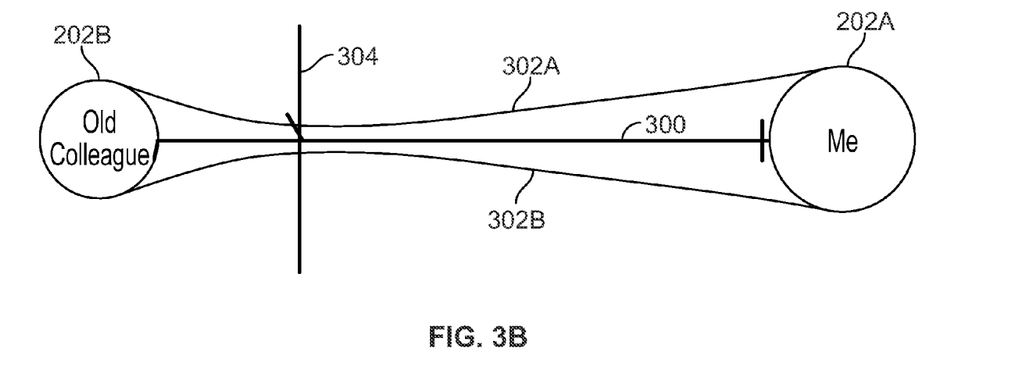
Figure 3C:
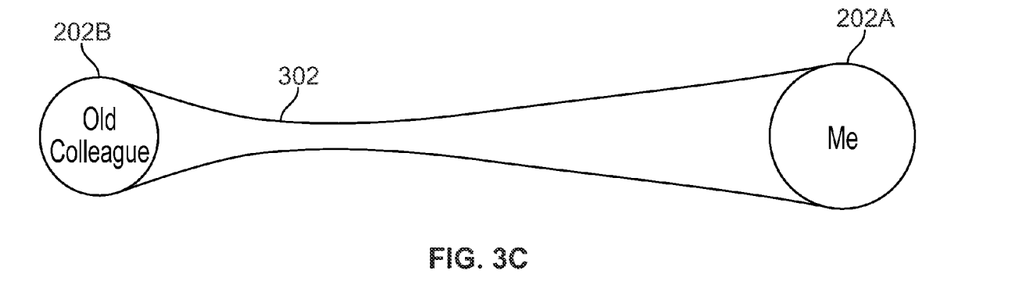

FIGS. 3A-C show an example of visualizing a recentness of a relationship. FIG. 3A schematically shows a timeline 300 that indicates three dates: Mar. 1, 2012, Mar. 8, 2012 and Jun. 4, 2012. These dates can be understood as follows: Mar. 1, 2012, is according to the table above the date of the first email interaction between the email account holder and "Old colleague". The table also indicates that after exchange of emails, the most recent electronic communication took place on Mar. 8, 2012, which is the second date in the timeline 300. The third date, finally, is when the visualization of relationships is being created (i.e., the "current date") in this example. That is, the timeline 300 indicates the beginning and end of the interaction between these two entities, and also places its duration in relation to the current date. A connection can be used to indicate this relationship, for example as will now be described.

FIG. 3B shows the timeline 300 together with a node 202A for the email account holder (labeled "Me") and another node 202B for the old colleague. The connection between these entities here includes lines 302A and B. That is, the lines 302A-B connect the two nodes to each other and have widths at its ends that reflect the respective numbers for the two entities. A line 304 marks the end of the interaction between these entities.

The connection between the nodes 202A-B indicates the relationship between the interaction and the current date. In some implementations, when the interaction ended some time ago, as it did here, the connection can indicate the proportion between the length of the interaction and the present. For example, the lines 302A-B can be bent at or near the line 304 so that the connection is narrowed. That is, the narrowing of the connection can indicate when, relative to the current date, the visualized interaction occurred. FIG. 3C shows the nodes 202A-B and the connection 302 without the timeline. For example, this visualization can be included in the visual representation 200 (FIG. 2).

In the illustrated example, the lines 302A-B are gradually narrowed so that the connection has a relatively smooth curve. In other implementations, the shape can be changed in another way. For example, at the line 304, the connection can change its width in form of a step or other shape.

Figure 4:
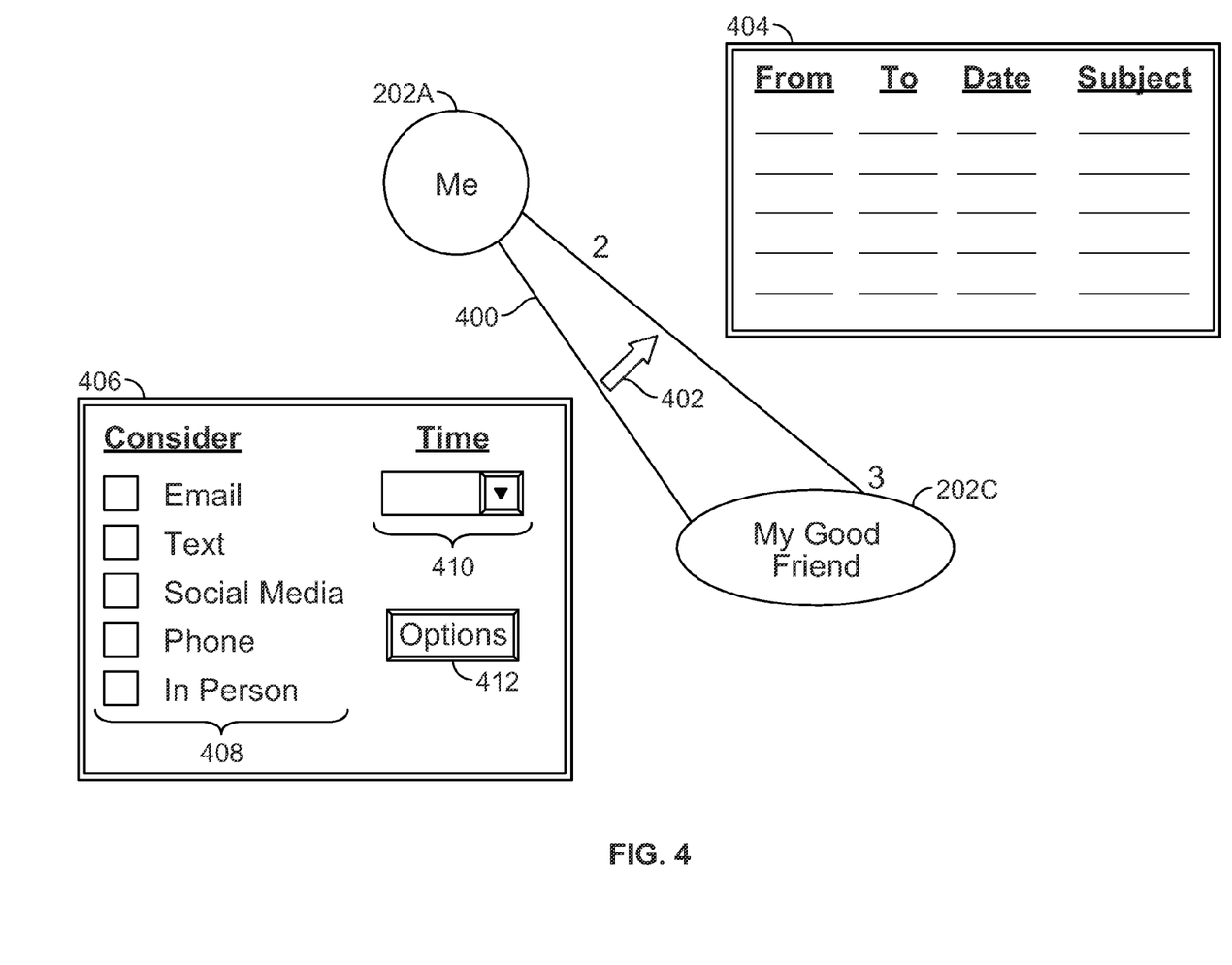
FIG. 4 shows an example of presenting additional information.

FIG. 4 shows an example of presenting additional information. Here, the Me node 202A and a "My good friend" node 202C are shown, joined by a connection 400. When the user activates the connection 400 with a cursor 402 (or other pointer) some action can be triggered. In some implementations, a view 404 can be shown to provide more of the underlying interaction information. For example, the view 404 can present the emails (here, five) that are the basis for the connection 400. The emails can be presented in terms of From and To addresses, date and subject, to name a few examples. The view 400 allows the user to explore any of the visualized relationships in detail.

In some implementations, the user (e.g., here the email account holder) can control what should be included in such interaction information. Here, a view 406 is presented, such as in response to the cursor 402 hovering over, or clicking on, the connection 400. The view includes a first area 408 where the user can specify types of contact should be the basis for analyzing the relationship. For example, the user can decide that email correspondence, text messages, social-media interactions, phone calls and/or in-person meetings (e.g., as determined by electronic calendar entries) should be taken into account. That is, the first area 408 allows the user to define the relationship broadly or narrowly for purposes of the visualization.

The view 406 here includes a second area 410 where the user can specify the relevant time(s) for which the relationship should be evaluated. For example, the user can decide that only interactions in the last year, or in the last week, should be taken into account.

The view 406 here includes an options button 412. In some implementations, the options button displays another view (not shown here) that gives the user additional aspects to configure. In such a view, the user can choose between options on the shape of connectors, the overall organization of the graph, the ranges of relationships to be included (or excluded), and/or the overall appearance of the visualization.

Figure 5:
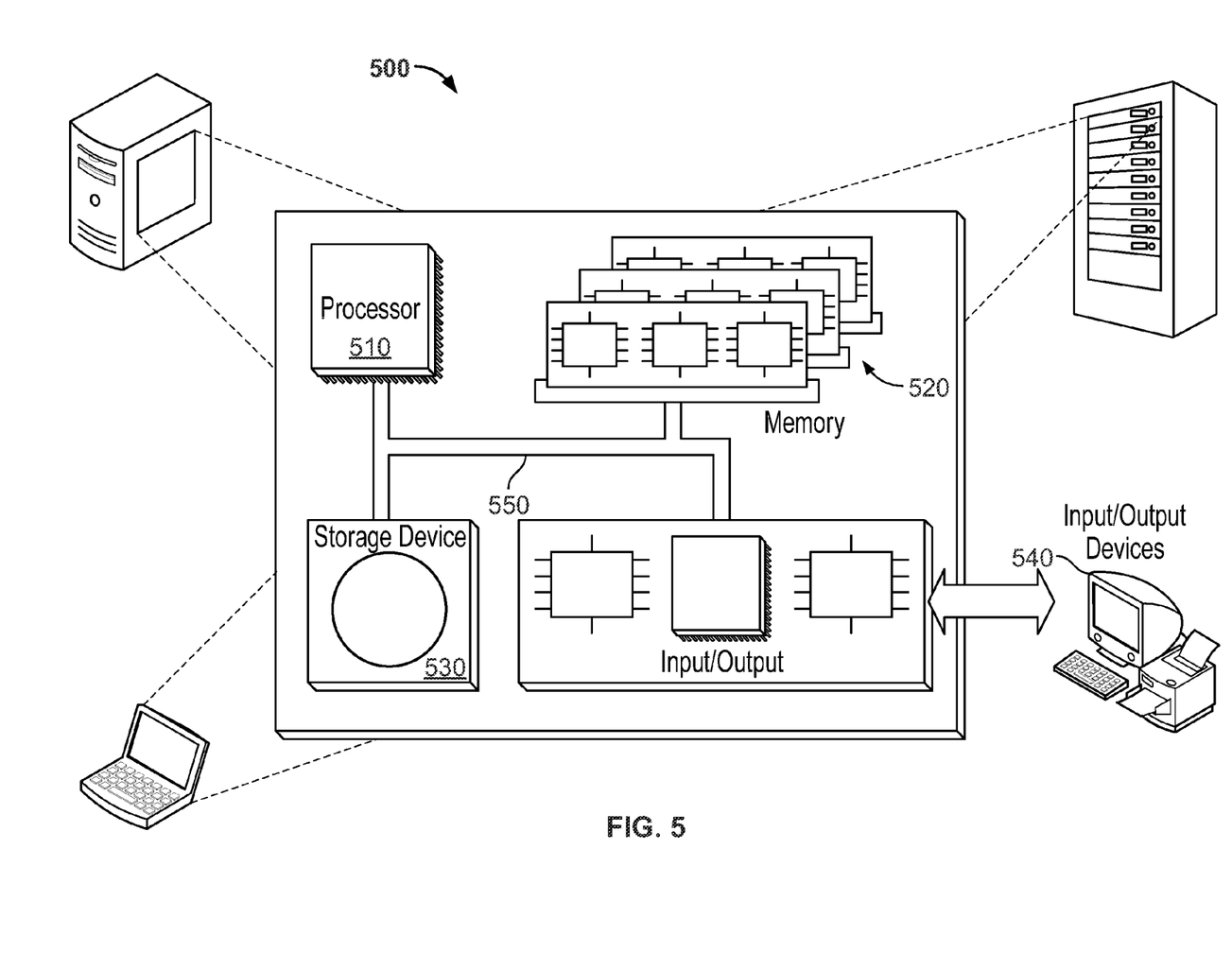
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for generating a visual representation of entity relationships, the method being executed by one or more processors and comprising:

receiving, by the one or more processors, interaction information representative of one or more interactions between a first entity and each of a plurality of second entities having a relationship to the first entity;

determining, by the one or more processors, using the received interaction information and for each of the relationships, a first measure indicating a recentness of the relationship and a second measure indicating a balance of the relationship between the first entity and each of the plurality of second entities; and presenting, by the one or more processors, visual representations of at least some of the relationships, at least one visual representation comprising a connection between a first node corresponding to the first entity and a second node corresponding to a second entity of the plurality of second entities, the connection comprising two lines having a length corresponding to the first measure and defining a shape corresponding to the second measure, the shape comprising a first base associated with the first node, a second base associated with the second node and a curvature forming a narrowing between the two lines that is perpendicular to the first base and the second base and indicates a most recent interaction between the first node and the second node, a width of the first base being different than a width of the second base based on the second measure.

2. The computer-implemented method of claim 1, wherein the first and second entities are first and second individuals and the interaction information reflects communications, wherein the first measure reflects when a most recent one of the communications occurred, and wherein the second measure reflects who of the first and second individuals initiated the communications.

3. The computer-implemented method of claim 1, wherein the first and second entities are first and second companies and the interaction information reflects purchases of goods or services, wherein the first measure reflects when a most recent one of the purchases occurred, and wherein the second measure reflects who of the first and second companies made the purchases.

4. The computer-implemented method of claim 1, wherein the second measure comprises first and second numbers for the first and second entities, respectively, and wherein an end of the connection toward the first entity has a width reflecting the first number and another end of the connection toward the second entity has a width reflecting the second number.

5. The computer-implemented method of claim 1, wherein the received information reflects interactions, the method further comprising identifying a date of an earliest interaction and a date of a most recent interaction, wherein the connection corresponds to a time axis from the date of the earliest interaction to a current date, and wherein the narrowing of the connection corresponds to the date of the most recent interaction.

6. The computer-implemented method of claim 1, further comprising presenting at least some of the received interaction information for one or more of the connections.

7. The computer-implemented method of claim 6, further comprising presenting a user interface for a user to control what is included in the interaction information.

8. A non-transitory computer program product tangibly embodied in a computer-readable storage medium and comprising instructions that when executed by a processor perform a method for generating a visual representation of entity relationships, the method being executed by one or more processors and comprising:

receiving, by the one or more processors, interaction information representative of one or more interactions between a first entity and each of a plurality of second entities having a relationship to the first entity;

determining, by the one or more processors, using the received interaction information and for each of the relationships, a first measure indicating a recentness of the relationship and a second measure indicating a balance of the relationship between the first entity and each of the plurality of second entities; and presenting, by the one or more processors, visual representations of at least some of the relationships, at least one visual representation comprising a connection between a first node corresponding to the first entity and a second node corresponding to a second entity of the plurality of second entities, the connection comprising two lines having a length corresponding to the first measure and defining a shape corresponding to the second measure, the shape comprising a first base associated with the first node, a second base associated with the second node and a curvature forming a narrowing between the two lines that is perpendicular to the first base and the second base and indicates a most recent interaction between the first node and the second node, a width of the first base being different than a width of the second base based on the second measure.

9. The non-transitory computer program product of claim 8, wherein the first and second entities are first and second individuals and the interaction information reflects communications, wherein the first measure reflects when a most recent one of the communications occurred, and wherein the second measure reflects who of the first and second individuals initiated the communications.

10. The non-transitory computer program product of claim 8, wherein the first and second entities are first and second companies and the interaction information reflects purchases of goods or services, wherein the first measure reflects when a most recent one of the purchases occurred, and wherein the second measure reflects who of the first and second companies made the purchases.

11. The non-transitory computer program product of claim 8, wherein the second measure comprises first and second numbers for the first and second entities, respectively, and wherein an end of the connection toward the first entity has a width reflecting the first number and another end of the connection toward the second entity has a width reflecting the second number.

12. The non-transitory computer program product of claim 8, wherein the received information reflects interactions, the method further comprising identifying a date of an earliest interaction and a date of a most recent interaction, wherein the connection corresponds to a time axis from the date of the earliest interaction to a current date, and wherein the narrowing of the connection corresponds to the date of the most recent interaction.

13. The non-transitory computer program product of claim 8, further comprising presenting at least some of the received interaction information for one or more of the connections.

14. The non-transitory computer program product of claim 13 further comprising presenting a user interface for a user to control what is included in the interaction information.

15. A system for generating a visual representation of entity relationships, the system comprising:

one or more processors; and a computer-readable medium coupled to the one or more processors having instructions stored thereon which, when executed cause the one or more processors to perform operations comprising:

receiving, by the one or more processors, interaction information representative of one or more interactions between a first entity and each of a plurality of second entities having a relationship to the first entity;

determining, by the one or more processors, using the received interaction information and for each of the relationships, a first measure indicating a recentness of the relationship and a second measure indicating a balance of the relationship between the first entity and each of the plurality of second entities; and presenting, by the one or more processors, visual representations of at least some of the relationships, at least one visual representation comprising a connection between a first node corresponding to the first entity and a second node corresponding to a second entity of the plurality of second entities, the connection comprising two lines having a length corresponding to the first measure and defining a shape corresponding to the second measure, the shape comprising a first base associated with the first node, a second base associated with the second node and a curvature forming a narrowing between the two lines that is perpendicular to the first base and the second base and indicates a most recent interaction between the first node and the second node, a width of the first base being different than a width of the second base based on the second measure.

16. The system of claim 15, wherein the first and second entities are first and second individuals and the interaction information reflects communications, wherein the first measure reflects when a most recent one of the communications occurred, and wherein the second measure reflects who of the first and second individuals initiated the communications.

17. The system of claim 15, wherein the first and second entities are first and second companies and the interaction information reflects purchases of goods or services, wherein the first measure reflects when a most recent one of the purchases occurred, and wherein the second measure reflects who of the first and second companies made the purchases.

18. The system of claim 15, wherein the second measure comprises first and second numbers for the first and second entities, respectively, and wherein an end of the connection toward the first entity has a width reflecting the first number and another end of the connection toward the second entity has a width reflecting the second number.

19. The system of claim 15, wherein the received information reflects interactions, the method further comprising identifying a date of an earliest interaction and a date of a most recent interaction, wherein the connection corresponds to a time axis from the date of the earliest interaction to a current date, and wherein the narrowing of the connection corresponds to the date of the most recent interaction.

20. The system of claim 15, further comprising presenting at least some of the received interaction information for one or more of the connections, and presenting a user interface for a user to control what is included in the interaction information.

* * * * *